Figure 8:
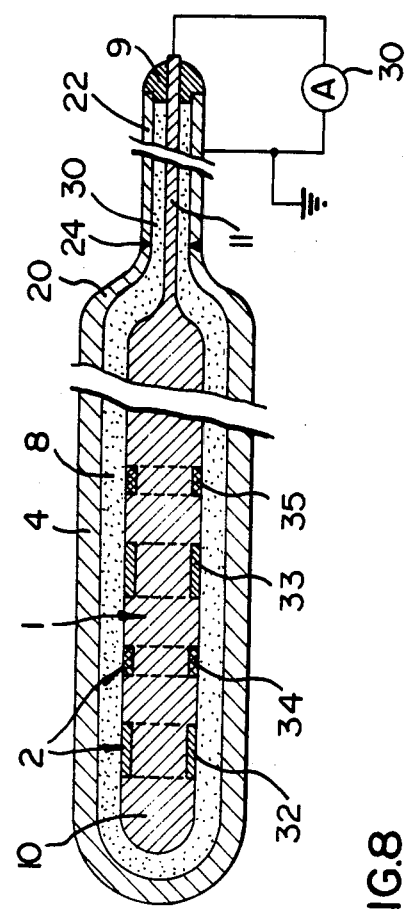

United States Patent [19]

Allan

[11] Patent Number: 4,569,705
[45] Date of Patent: Feb. 11, 1986

[54] METHOD OF MANUFACTURING A LENGTH OF MINERAL INSULATED CABLE HAVING PREDETERMINED γ-RAY SENSITIVITY IN A HIGH RADIATION ENVIRONMENT

[75] Inventor: Colin J. Allan, Deep River, Canada

[73] Assignee: Atomic Energy of Canada Limited, Chalk River, Canada

[21] Appl. No.: 605,469

[22] Filed: Apr. 30, 1984

Related U.S. Application Data

[63] Continuation-in-part of Ser. No. 283,103, Jul. 13, 1981, abandoned.

[51] Int. Cl.⁴ .................................... H01B 13/00
[52] U.S. Cl. .................................. 156/52; 29/614; 250/390
[58] Field of Search ............... 29/614; 156/52, 293, 156/294; 219/544; 250/390 R; 338/238; 428/36

[56] References Cited

U.S. PATENT DOCUMENTS

| | | | |
|---|---|---|---|
| 3,615,960 | 10/1971 | Hoshii et al. | 156/52 X |
| 3,904,881 | 9/1975 | Klar et al. | 250/390 R |
| 4,123,658 | 10/1978 | Johansson | 250/390 R |
| 4,197,463 | 4/1980 | Todt et al. | 250/390 R |
| 4,263,577 | 4/1981 | Bauchert et al. | 219/544 X |
| 4,267,454 | 5/1981 | Playfoot et al. | 250/390 R X |
| 4,284,893 | 8/1981 | Allan et al. | 250/390 R |
| 4,396,839 | 8/1983 | Playfoot et al. | 250/390 R X |

Primary Examiner—Robert A. Dawson

[57] ABSTRACT

A method of manufacturing, as a length of mineral insulated cable, a self-powered neutron flux detector, a lead cable therefor or both, with the detector, the lead cable or both having predetermined γ-ray sensitivity in a high radiation environment, is provided wherein metal bands are provided around the detector core wire, the lead cable core wire or both, inside the sheath to control the γ-ray sensitivity. The metal bands, and sleeves of a frangible insulation, are assembled in an oversize sleeve which is then reduced in diameter to pulverize the frangible sleeves, each metal band being in electrical contact with either the core wire or sheath. The metal bands incorporated in the lead cable predetermine the γ-ray (and hence the dynamic response) of the lead cable, the metal bands incorporated in the detector predetermine the γ-ray response (and hence the dynamic response) of the detector.

15 Claims, 9 Drawing Figures

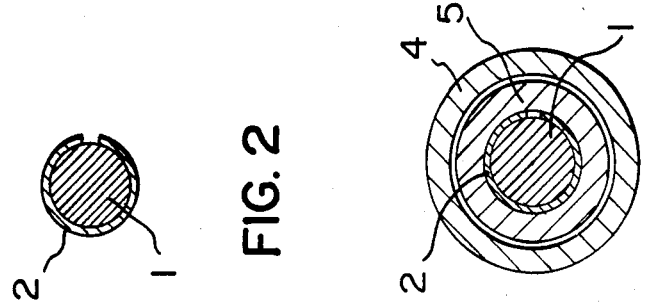
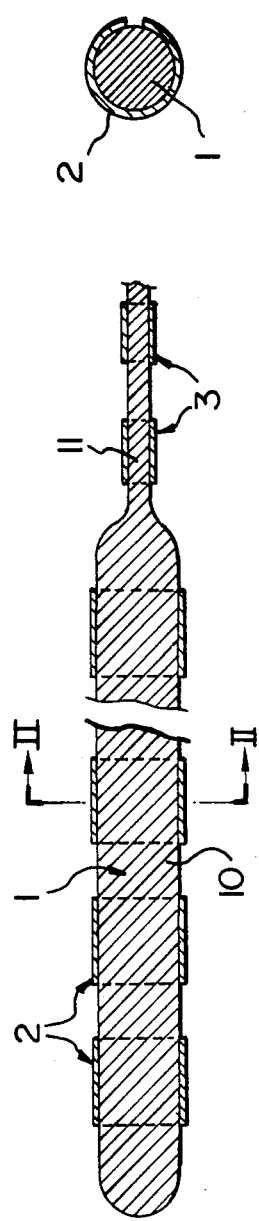
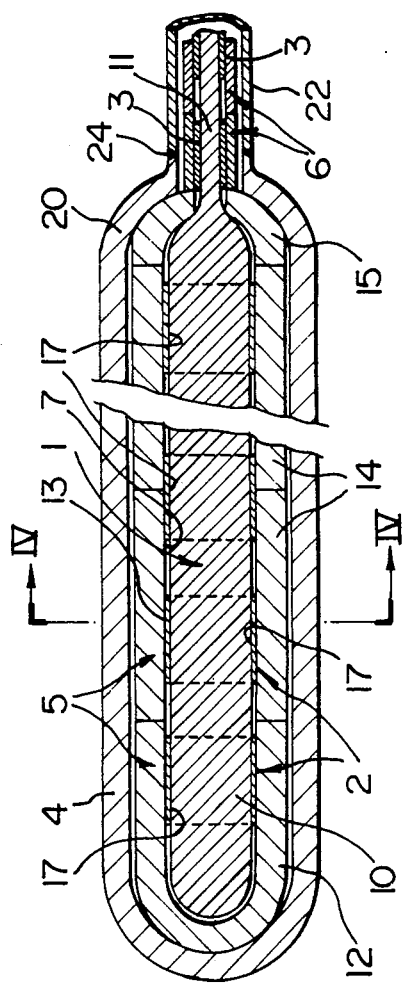
FIG. 1  FIG. 2  FIG. 3  FIG. 4

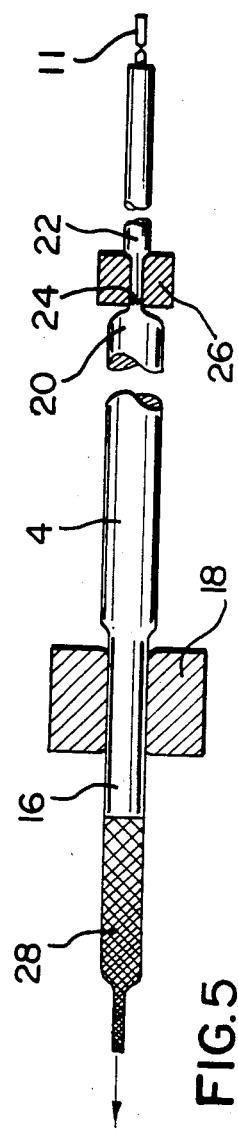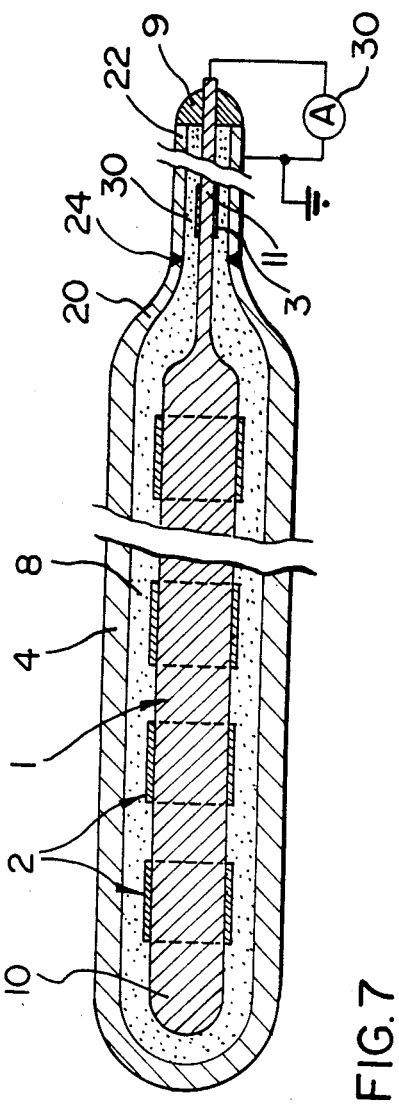
FIG.5
FIG.6
FIG.7

METHOD OF MANUFACTURING A LENGTH OF MINERAL INSULATED CABLE HAVING PREDETERMINED γ-RAY SENSITIVITY IN A HIGH RADIATION ENVIRONMENT

This is a continuation-in-part application of U.S. patent application No. 283,103, filed July 13, 1981 and now abandoned.

This invention relates to a method of manufacturing a length of mineral insulated cable having predetermined γ-ray sensitivity in a high radiation environment.

Self-powered neutron and γ-ray flux detectors are used extensively in a high radiation environment in nuclear power reactors. In some applications, they are used as the primary detector in the reactor safety system, while in other applications, they are used as the primary detector in the reactor control system. In such applications, it is highly desirable that the dynamic response of the detector match the dynamic behaviour of the nuclear fuel power. Although most of the thermal power in a nuclear fission reactor is due to the direct fission of the nuclear fuel, the so-called nuclear fission power, a significant fraction of the power is due to the β-ray and γ-ray energy released by radioactive fission fragments, the so-called delayed power. In natural uranium, heavy water reactors, of the CANDU type, for example, about 93% of the equilibrium thermal power generated in the nuclear fuel is due to direct fission of the fuel while about 7% is due to the decay of the fission fragments. The former component follows changes in neutron flux promptly while the latter component does not since the fission fragments decay with a wide range of time constants that vary from seconds to days.

In other applications, self-powered detectors are used primarily to map the thermal flux distribution in the reactor. In those applications, it is desirable to use detectors that have a negligible γ-ray sensitivity.

For use in nuclear reactor control- and safety-systems, the ideal neutron and γ-ray flux detector would respond to changes in neutron flux in exactly the same manner that the nuclear fuel does.

A self-powered neutron and γ-ray flux detector usually consists of a co-axial mineral-insulated cable. The central electrode is called the emitter while the outer electrode is called the collector. The two electrodes are electrically insulated from one another by a mineral oxide insulation, usually MgO or $Al_2O_3$, although other oxides could be used. In many applications, the self-powered detector is used to measure the power, or flux, over a limited region of the reactor core. In these applications, the detector is connected to a lead cable which may also be a co-axial mineral insulated cable. However, by an appropriate choice of geometry and materials, and sometimes also by using lead cable compensation techniques, the self-powered signal generated in the lead cable can be made to be a small fraction of that generated in the detector.

In a power reactor, the current generated in a mineral insulated cable, be it a self-powered detector or a lead cable therefor, can be attributed to three separate interactions, namely:

(n, β) interaction in which a β-active daughter nuclide is created by neutron capture in the detector, normally the emitter electrode;

(n, γ, e) interactions in which the γ-rays produced by neutron capture in the detector liberate free electrons by Compton and photoelectric processes and, hence, cause a net flow of current between the two electrodes; and (γ, e) interactions in which reactor γ-rays produced in the fuel and reactor hardware interact in the detector and produce a net flow of current between the two electrodes.

Because the (n, β) interaction is delayed, detectors in which such interactions are the dominant electrical current producing mechanism, such as detectors having emitters of vanadium or rhodium, are not suitable for use as the primary detector in reactor control- and safety-systems. Therefore, detectors in which the current is essentially due only to (n, γ, e) and (γ, e) interactions are used in these applications. It should be noted that it is all but impossible to build a detector in which there are absolutely no (n, β) interactions but that by a careful choice of material it is possible to reduce the current fraction produced by such interactions to less than a few percent of the total signal.

An idealized detector, in which 100% of the signal is due to (n, γ, e) interactions, would respond effectively instantaneously to changes in neutron flux, i.e. such a detector would be 100% prompt. Thus, its response would be too fast for an ideal power detector since, as discussed above, the power in the fuel is only about 93% prompt. On the other hand, an idealized detector in which 100% of the signal is due to (γ, e) interactions would respond too slowly since about $\frac{1}{3}$ of reactor γ-rays are delayed, so that only about 67% of the signal component in such a detector would be prompt.

However, a detector in which 21% of the signal were due to (γ, e) interactions and 79% of the signal were due to (n, γ, e) interactions, would have a prompt fraction of 93%, i.e. it would have the same prompt fraction as the nuclear fuel power. Further, since the delayed detector response is due to delayed reactor γ-rays, it would match, to a good approximation, the delayed nuclear fuel power, since the delayed γ-rays arise from the decay of the fuel fission products which are also the source of the delayed thermal power in the nuclear fuel.

In applications where it is desired to measure flux rather than power, there is often a problem, particularly in light water reactors, with choosing materials to obtain both a relatively large (n, γ, e) response, i.e. a prompt neutron response, and a negligible (γ, e) response.

Further, in light water reactors, the signal from co-axial lead cables is, in many cases, dominated by the (γ, e) interaction so that to reduce the current generated in the lead cable, it is necessary to reduce the γ-ray sensitivity of the cable.

In all three applications, i.e. for prompt detectors for use in reactor safety and control systems, prompt flux-mapping detectors and for lead cables, what is required is a generalized and practical method of controlling the γ-ray sensitivity.

Attempts have been made to control the dynamic response of a self-powered neutron and γ-ray flux detector, in a nuclear reactor, by controlling the relative response of the detector to the nuclear reactor γ-rays and to the nuclear reactor neutron flux so as, for example, to closely match the dynamic response of the detector signal to the dynamic response of the total nuclear fuel power.

One method of controlling the relative response of the detector to the nuclear reactor γ-rays and to the nuclear reactor neutron flux, as disclosed in U.S. Pat. No. 4,284,893, dated Aug. 18, 1981, "Self-Powered Neutron and Gamma-Ray Flux Detector", C. J. Allan et al, is to use a relatively thick emitter core cladding layer, say of the order of 0.05 mm in thickness, of say platinum, as a complete covering on an emitter core wire of, say, Inconel [trademark]. The relative response of this type of detector is dependent upon the diameter of the emitter as well as on the choice of metals for the emitter core. Thus, a specific response dictates a particular geometry and this may introduce a problem in that the geometry may not be compatible with one or more constraints on the size of the detector such as, for example, as may be imposed by the manufacturing procedure or by space limitations in the assembly used to contain the detectors. If, for example, a detector having an emitter core comprising an Inconel core clad with platinum is required to have a dynamic response which matches the dynamic response of the fuel power in a heavy-water-moderated, natural-uranium reactor, then the detector emitter must have an overall diameter of about 2.9 mm. Such a detector will have an outside diameter of about 5.0 mm and the accommodation of such a large detector in existing heavy-water-moderated, natural-uranium reactors would introduce problems.

Another method of controlling the relative response of the detector to the nuclear reactor $\gamma$-rays and to the nuclear reactor neutron flux, as disclosed in U.S. Pat. No. 4,123,658, dated Oct. 31, 1978, "Self-powered Neutron Detector", L. O. Johansson, is to use a very thin (less than 5 microns) cladding of, for example, platinum on a cobalt core. By controlling the thickness of the cladding layer, the response to reactor $\gamma$-rays and hence, the dynamic response can be controlled. While the detectors proposed by Johansson are useful, there is a manufacturing problem with them in that it is very difficult to control the thickness of the very thin cladding layers required. Hence, it is difficult to achieve adequate control of the dynamic response of the detector.

Yet another method of controlling the response of the detector to the reactor $\gamma$-rays, as disclosed in U.S. Pat. No. 3,904,881, dated Sept. 9, 1975, "Neutron Detector", E. Klar et al, is to use a compound emitter comprising a series of cylinders of dissimilar metals joined end-to-end, for example, by welding. There are, however, a number of potential manufacturing problems wth these detectors that increase their cost. For example, great care has to be taken to ensure that the sections do not separate during manufacturing or use, and possibly cause a partial or complete loss of signal.

Further, if more than a few sections were required, it would be expensive to join all the individual sections together.

Thus, there is a need for a method of manufacturing a self-powered neutron flux detector and a lead cable therefor, each having predetermined $\gamma$-ray sensitivity in a high radiation environment whereby, for example, a dynamic response which closely matches the dynamic response of the fuel power is achieved, and which presents no particular manufacturing problems.

According to the present invention, there is provided a method of manufacturing a length of mineral insulated cable having a predetermined $\gamma$-ray sensitivity in a high radiation environment, comprising:

(a) assembling an oversize outer metal sheath, a metal core wire along the bore of the metal sheath, metal bands at spaced intervals along, and extending around, the core wire, and frangible sleeves of an electrically insulating material in end-to-end relationship along and between the core wire and the metal sheath, the metal bands each having only one cylindrical surface adjacent to one cylindrical side of the frangible sleeves 4, (b) reducing the diameter of the metal sheath so that the frangible sleeves are crushed into discrete particles holding the core wire spaced from the metal sheath, in the form of a mineral insulated cable, and forming an electrically insulating layer around only the said one cylindrical surface of each metal band with the other cylindrical surface of each metal band in electrical contact with the metal sheath or the core wire, and (c) sealing the bore of the metal sheath.

Metal bands may be assembled directly on to, and spaced at intervals along the core wire, and be reduced into electrical contact therewith and against dislodgement therealong before the frangible sleeves are assembled around the core wire.

Metal bands may be assembled on, insulated from, and at spaced intervals along the core wire, and the metal sheath reduced into electrical contact with them.

In some embodiments of the present invention, (a) the core wire is of a material selected from the group consisting of nickel, iron, titanium, chromium, cobalt, and alloys based on at least one of these metals; and (b) the bands are of a material selected from the group consisting of platinum, palladium, tantalum, osmium, molybdenum, cerium, tin, ruthenium, niobium, zirconium, and alloys based on at least one of the metals.

In other embodiments of the present invention, the bands comprise in the range of five to ten bands of equal width equally spaced longitudinally along the length of the emitter core wire.

In other embodiments of the present invention, the bands overlie of the order of 40 to 60% of the core wire surface area.

In other embodiments of the present invention, the core wire is a nickel-base alloy nominally containing 76% nickel, 15.8% chromium, and 7.20% iron, by weight, and the bands are of platinum.

In the embodiments of the present invention, wherein the detector is for use as a fuel power detector in a heavy-water-moderated, natural-uranium reactor, the core material is preferably of a nickel-base alloy nominally containing 76% nickel, 15.8% chromium, and 7.20% iron, by weight, or of high purity iron, or of high purity nickel; the bands are preferably of platinum, or of tin, or of molybdenum; and the overall diameter of the core wire and the bands is preferably less than or of the order of 2 mm.

In other embodiments of the present invention, the core wire is of substantially pure nickel and the bands are of platinum.

In some embodiments of the present invention, (a) the core wire is of a material selected from the group consisting of nickel, iron, titanium, chromium, cobalt, and alloys based on at least one of these metals; and (b) the bands comprise at least two bands of different materials selected from the group consisting of platinum, palladium, tantalum, osmium, molybdenum, cerium, tin, ruthenium, niobium, zirconium, and alloys based on at least one of these metals.

In some embodiments of the present invention, the metal bands have a thickness in the range of the order of 0.02 mm to of the order of 0.07 mm after the metal sheath has been reduced.

In other embodiments of the present invention, the material of the metal sheath is selected from the group consisting of zirconium, niobium and alloys based on these materials, and the metal bands are adjacent to and in electrical contact with the metal sheath and are of at least one material selected from the group consisting of nickel, iron, titanium, chromium, aluminum, magnesium, beryllium, and alloys wherein at least one of these materials comprise the major component.

In some embodiments of the present invention the sheath is of a material selected from the group consisting of nickel, iron, titanium, chromium, and alloys based on at least one of these materials, and the metal bands are adjacent to and are in electrical contact with and are of a material selected from the group comprising platinum, palladium, tantalum, osmium, molybdenum, cerium, tin, ruthenium, niobium, zirconium, and alloys based on at least one of these materials.

Figure 9:
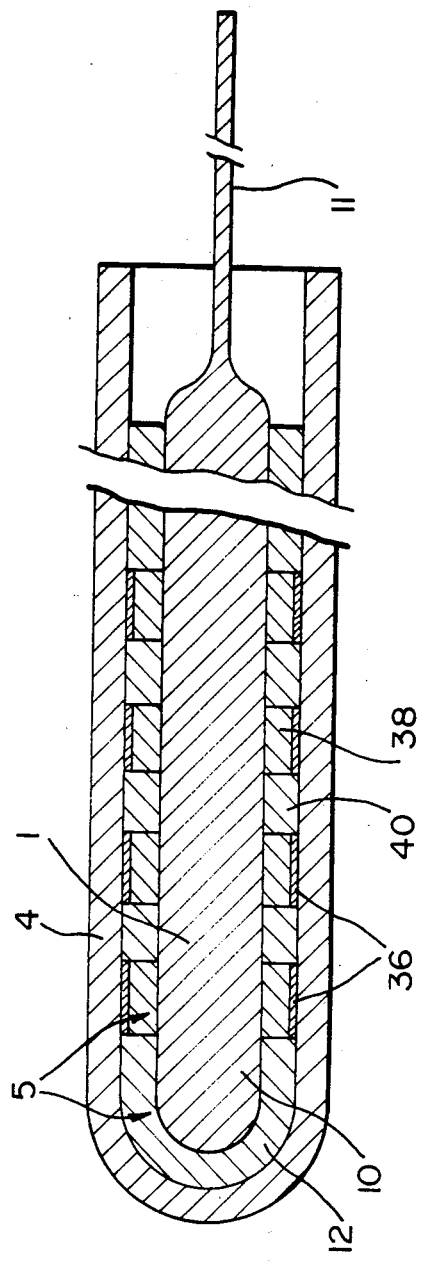

In the accompanying drawings which illustrate, by way of example, embodiments of the present invention, FIG. 1 is a broken, sectional side view of an emitter core wire, and lead cable core wire, for a self-powered, neutron flux detector, each having predetermined γ-ray sensitivity in a high radiation environment, FIG. 2 is a sectional end view along II—II, FIG. 1, FIG. 3 is a broken sectional side view of the core wires of FIGS. 1 and 2 assembled with frangible, dielectric sleeves and an oversize, outer metal sheath, FIG. 4 is a sectional end view along IV—IV, FIG. 3, FIG. 5 is a broken, partly sectional side view of the assembly shown in FIGS. 2 and 3 about to be drawn through a swaging die, FIG. 6 is a broken, side view of the assembly shown in FIG. 3 after being swaged, FIG. 7 is a broken, sectional side view of the self-powered, neutron flux detector manufactured according to the steps shown in FIGS. 1 to 6, FIG. 8 is a broken, sectional side view of a different, self-powered, neutron flux detector to that shown in FIG. 7, and FIG. 9 is a broken, sectional side view of a core wire, frangible dielectric sleeves, metal bands and an oversize, outer metal sheath assembled for swaging into yet another type of neutron flux detector.

Referring now to FIGS. 1 to 5, the various steps of a method of manufacturing, as a length of mineral insulated cable, a self-powered, neutron flux detector and a lead cable therefor, having predetermined γ-ray sensitivity in a high radiation environment are shown, comprising:

(a) assembling an oversize, outer metal sheath 4, a metal core wire 1 along the bore of the metal sheath 4, metal bands 2 and 3 at spaced intervals along, and extending around, the core wire 1, and frangible sleeves 5 and 6 of an electrically insulating material in end-to-end relationship along and between the core wire 1 and the metal sheath 4, the metal bands 2 and 3, each having only one cylindrical surface adjacent to one cylindrical side of the frangible sleeves 4, in this embodiment, cylindrical surface 13 adjacent cylindrical side 7 (FIG. 3), (b) reducing the diameter of the metal sheath 4, as shown in FIG. 5, so that the frangible sleeves are crushed into discrete particles 8, as shown in FIG. 7, holding the core wire 1 spaced from the metal sheath 4, in the form of a mineral insulated cable, and forming an electrically insulating layer around only one cylindrical surface, such as cylindrical surface 13, of each metal band 2 and 3, with the other cylindrical surface of each metal band 2 and 3, such as cylindrical surface 17, in contact with the core wire 1, and (c) sealing the bore of the metal sheath 4 by a seal 9, as shown in FIG. 6.

In this embodiment of the present invention, the metal bands 2 and 3 are assembled directly on to, and spaced at intervals along, portions 10 and 11, respectively, of the core wire 1 and are reduced into electrical contact therewith and against dislodgement therealong by swaging before the frangible sleeves are assembled around the core wire 1. It should be noted that the metal bands 2 and 3 may be formed from strip and need not extend totally around the core wire portions 10 and 11.

The frangible sleeves 5 comprise a thimble-shaped end sleeve 12 (FIG. 3), cylindrical sleeves 14 and a domed sleeve 15.

A trailing end portion 20 (FIG. 3) is swaged by, for example, a hand to shape the end portion 20 around the domed sleeve 15. An oversize metal sheath 22 is slid over the frangible sleeves 6 and is welded by a but weld 24 to the portion 20.

A leading end portion 16 (FIG. 5) of the metal sheath is swaged by, for example, a hand tool (not shown) in order that the end portion 16 can be threaded through a swaging die 18. An open mesh stocking 28 is fitted over most of the end portion 16 to facilitate hauling the remainder of the metal sheath 4 through the die 18.

After the metal sheath 4 has been swaged along its entire length, the end portion 20 and a leading end of the oversize metal sheath 22, are reduced as shown in FIG. 5 in order that a split die 26 may be assembled therearound and used to reduce the sleeves 6 into powdered mineral insulation 30 and form the lead cable.

The seal 9 (FIG. 7) is an epoxy resin seal.

Thus, a detector and lead cable are formed having powdered mineral insulation 8 (FIG. 7).

The overall diameter of the core wire portion 10 and the metal bands 2, for an emitter for a self-powered, neutron flux detector, is preferably selected from the range of at least of the order of 0.4 mm in diameter, and the metal bands 2 are preferably selected to cover only of the order of 10% to of the order of 90% of the surface area of the core wire portion 10 and are selected to be of the order of 0.02 mm to of the order of 0.07 mm in thickness, whereby the detector has a particular γ-ray sensitivity, for example, so that it has a prompt-fraction in the range of the order of 90% to of the order of 96% and a dynamic response which substantially matches the dynamic response of the power in the fuel of the nuclear reactor in which the detector is to be used.

In one embodiment, a self-powered, neutron flux detector has a core wire portion 10 of Inconel and metal bands 2 of platinum. The frangible sleeves may be of a metal oxide, for example, magnesium oxide.

A means 30 for measuring the magnitude of an electrical current between the core wire portion 10 and the metal sheath 4 is provided to determine the neutron flux within which the detector is placed.

The dynamic response of such a neutron flux detector, made in accordance with the present invention, depends on:

(i) the fraction of the core wire portion 10 that is covered, the higher the fraction, the slower the response;

(ii) the diameter of the core wire portion 10 and bands 2, in that the smaller the diameter of the emitter, the slower the response; and (iii) the atomic number of the metal of the bands 2, the lower the atomic number, the faster the response. For a given diameter for the core wire portion 10 and bands 2, a given core wire portion 10 material, and a given material for the bands 2, there will, in general, be an optimum value for the fraction of the surface area of the core wire portion 10 to be covered such that the dynamic response of the detector best matches the delayed power in the nuclear fuel. This fraction can be readily determined by experimentally measuring the dynamic response of a detector, having a core wire portion 10 with no bands 2 and by measuring the dynamic response of a detector having a core wire portion 10 which is completely covered by bands 2. Thus, for example, if $F_1$ is the prompt fraction of the detector of the first type, i.e. one with no bands 2, and $F_2$ is the prompt fraction of the detector of the second type of emitter, i.e. one for which the bands 2 completely cover the core wire portion 10, and if $F_{fuel}$ is the fraction of the fuel power that is prompt, then a detector in which the bands 2 cover a fraction X of the core wire portion 10 would have a prompt fraction equal to the prompt fraction of the fuel power if:

$X = (F_1 - F_{fuel})/(F_1 - F_2)$

Experiments have shown that for a detector whch is 3.0 mm in diameter, having an overall diameter for the core wire portion 10 and bands 2, about 1.5 mm is diameter, with metal sheath 4 of nickel, a core wire portion 10 of nickel, and bands 2 of platinum, $F_1$ is about 1.02; and $F_2$ is about 0.90. Thus, to obtain a prompt fraction of 0.93, which is the fraction of the power in the fuel that is prompt in a natural-uranium, deuterium-moderated nuclear reactor of the CANDU type, a detector having a core wire portion 10 of nickel, of which approximately 75% is covered with bands 2 of platinum, is used. For use in a reactor safety system, it would be desirable if the detector response were slightly faster than the power in the fuel so that a somewhat smaller fraction of the core wire portion 10 would preferably be covered.

The dynamic response of a detector having a given type of core wire portion 10 and metal bands 2 also depends on the material used for the metal sheath 4. Thus, for example, it has been found that if the nickel metal sheath 4 of the above detector is replaced by a metal sheath 4 of Zircaloy, then $F_1$ is about 1.04; and $F_2$ is about 0.80, so that to achieve a prompt fraction of about 0.93 with a Zircaloy-sheathed detector, preferably a detector in which only about 46% of the nickel core wire portion 10 is covered with the platinum bands 2 is used, assuming an overall diameter of 1.5 mm for the core wire portion 10 and the bands 2.

In practice, matching the prompt fraction of the detector to the prompt power in the fuel, using a single material for the bands 2, will not necessarily result in a perfect match of all the delayed components, since it is not in general possible to fabricate a detector having a zero contribution from (n, $\beta$) interactions. For example, using the above materials for the core wire portion 10 and bands 2, namely nickel and platinum, small delayed currents will be attributable on the $\beta$-decay of $^{199}Pt$ which has a half-life of 30.8 minutes and to the $\beta$-decay of $^{65}Ni$ which has a half-life of 2.57 hours. Nonetheless, a close overall match of the dynamic response of the detector to that of the fuel power will be possible.

It is known from the previously mentioned U.S. Pat. No. 4,284,893 that the $\gamma$-ray sensitivity of an emitter comprising a core wire portion 10 and bands 2, is saturated at a core wire cladding thickness of at least about 0.03 mm. By using one or more bands, such as 2, the band or bands can be made at least of the order of 0.02 mm in thickness, so that the detector sensitivity is not subject to variations introduced during manufacture by variations in the thickness of the bands, such as 2. Furthermore, by varying the total percentage of the surface area of the core wire portion 10 that is covered by the bands 2, a particular dynamic response can be achieved for a detector having a particular overall diameter and a core wire portion 10 and bands 2 of particular metals. Thus, for a detector having a particular overall diameter and particular metals for the core wire portion 10 and bands 2, the total percentage of the surface area of the core wire portion 10 that is covered can be selected for a practical overall diameter for the emitter and for a desired dynamic response. Since the overall sensitivity of the detector decreases with smaller and smaller overall core wire diameters, there is a practical lower limit to the overall core wire and band diameter that can be used, and this is of the order of 0.4 mm.

As stated above, the percentage of the surface area of the core wire portion 10 that is covered by the bands 2 is the most important factor affecting the dynamic response for given metals for the emitter core wire portion 10 and bands 2. However, the location of the band or bands, if only one or two bands cover the core wire, will cause a second order effect to be introduced. Hence, to minimize the second order effect, it is preferable to cover the core wire portion 10 with a relatively large number of bands 2, preferably five to ten bands, of equal width and equally spaced along the length of the core wire portion 10, in order to obtain the desired coverage.

The above comments also apply to the bands 3 on the core wire portion 11 of the lead cable.

In FIG. 8, similar parts to those shown in FIGS. 1 to 7 are designated by the same reference numerals and the previous description is relied upon to describe them.

Referring to FIG. 8, it is possible to improve the match by using a first set of bands, such as 32 and 33, of a different material to that of a second set of bands, such as 34 and 35, for a given material for the core wire 1. Thus, for example, one could use a combination of Pt, for the first set of bands (32 and 33), and Mo, for the second set of bands (34 and 35), on a core wire portion 10 of nickel. The prompt fraction would then be given by:

$F_{Com} = F_{Ni}(1 - X_{Pt} - X_{Mo}) + X_{Pt}F_{Ni}{}^{Pt} + X_{Mo}F_{Ni}{}^{Mo}$ where, $F_{Com}$ is the prompt fraction of the compound detector, $F_{Ni}$ is the prompt fraction obtained with a detector having a bare nickel core wire portion 10, i.e. one with no bands 32 to 35;

$F_{Ni}{}^{Pt}$ is the prompt fraction of a detector having a nickel core wire portion 10 completely covered with a layer of Pt;

$F_{Ni}{}^{Mo}$ is the prompt fraction of a detector having a nickel core wire portion 10 completely covered with a layer of Mo;

$X_{Pt}$ is the fraction of the nickel core wire portion 10 that is covered with bands, such as 32 and 33, of Pt; and $X_{Mo}$ is the fraction of the nickel core wire portion 10 that is covered with bands, such as 34 and 35, of Mo. Similarly, the delayed components will be a linear combination of the delayed responses obtained with the three arch-typical emitters. The optimum response would normally be determined by a trial and error calculation process by comparing the dynamic response obtained for a given set of values for $X_{Pt}$ and $X_{Mo}$ with the dynamic behaviour of the fuel power.

It should be noted that the bands 32 and 33 need not be of the same thickness as the bands 34 and 35. Similarly, the bands 32 and 33 need not be of the same width as bands 34 and 35.

It should also be noted that bands such as 32 to 35 may be provided on the core wire portion 11 of the lead cable.

A detector or lead cable with bands 32 to 35 may be manufactured in the same manner as that described with reference to FIGS. 1 to 7.

There are a number of methods of manufacturing the core wire portions 10 and 11 with the band or bands according to the present invention, and this will largely be dictated by the metals used for the core wire portions 10 and 11 and the band or bands, for example, the bands 2 and 6 may be plated or unmasked band portions of the core wire portions 10 and 11.

If the core wire portions 10 and 11 are of a metal which is highly ductile, such as substantially pure nickel, and the bands metal are preferably relatively hard compared to that of the core wire portions 10 and 11, then one or more tubular lengths for the band material or materials, can be placed over oversized core wire portions 10 and 11 and the assembly passed through swaging dies to press the band or bands into the surfaces of the core wire portions 10 and 11 while the latter are being reduced to the desired diameters.

If, however, the core wire portions 10 and 11 are of a relatively hard metal compared to that of the band or bands, then the band or bands can be formed by first wrapping, for each band, a layer of the metal in the form of closed coiled wire, strip or sheet, along lengthwise extending sections of the core wire portions 10 and 11, and then flattening each metal band onto the surfaces of the core wire portions 10 and 11. In this instance, the band or bands may at least partially protrude from the surfaces of the core wire portions 10 and 11, as shown in FIGS. 1 to 7.

A third method of manufacturing the core wire portons 10 and 11 with the bands 2 and 3 is, for each band, to wrap a closed or open helix of thin metal foil or wire around the core wire portions 10 and 11 and to fasten the ends of the helix to the core wire portions 10 and 11 by, for example, welding, peening or crimping, and then to rely upon the swaging of the metal sheaths 4 and 22, and dielectric insulation to press and hold the band or bands 2 in position.

In FIG. 9, similar parts to those shown in FIGS. 1 to 7 are designated by the same reference numerals and the previous description is relied upon to describe them.

The neutron flux detector assembly shown in FIG. 9 has bands 36 adjacent to the metal sheath 4 and two sizes of frangible sleeves are used, one designated 38 fits snugly underneath a band 36, while the other designated 40 is larger and holds the bands 36 in spaced relationship. The assembly shown in FIG. 9 may be swaged and further processed, in the same manner as that described with reference to FIGS. 5 to 7, so that the bands 36 are in electrical contact with the metal sheath 4.

It should be noted that different sized frangible sleeves may also be used in the embodiment described with reference to FIGS. 1 to 7 to hold those bands in spaced relationship. The bands 3 may be incorporated in the lead cable in order to match the dynamic response characteristics of the lead cable to those of the detector or to reduce the γ-ray response of the lead cable to a negligible value.

In nuclear reactors, the power in the nuclear fuel is generally 93% prompt and so the detector is preferably 93 to 95% prompt because it is desirable to use a detector that responds slightly faster than the nuclear fuel.

It will be clear from the previous description of the present invention that the same general technique can be used to obtain other dynamic response characteristics of a mineral insulated cable for use, for example, as a self-powered, neutron flux detector or lead cable, such as, for example, to cancel the delayed response due to reactor γ-rays, and so match substantially the response to the neutron flux.

It is also well known that mineral insulated cables that employ the same metal for the core-wire and the collector generally have a negative γ-ray sensitivity. If a different collector material is used and if the atomic number of the collector is greater than that of the core-wire, the magnitude of the negative γ-ray sensitivity increases. This effect can be reduced, and in some cases even cancelled, if, in accordance with some embodiments of the present invention, bands of metal of a low atomic number are placed on the inside surface of, and in electrical contact with, the collector sheath.

U.S. Pat. No. 4,197,463, dated Apr. 8, 1980, "Compensated Self-Powered Neutron Detector", W. H. Todt et al, have, for example, suggested using a thin platinum layer disposed on the inside surface of an Inconel collector to reduce the large positive γ-ray response that results when the emitter of a prompt responding self-powered detector is covered with a platinum layer for the purpose of eliminating the delayed (n, β−) signal resulting from the production of β-emitters in the emitter. However, one aim of the present invention is to reduce the magnitude of the negative γ-ray response from detectors and lead cables in which the atomic number of the collector sheath is greater than or about the same as that of the core-wire/emitter, whereby for a given set of materials, the γ-ray response can be easily controlled by varying the fraction of the collector sheath inner surface that is covered. Thus, the present invention represents a significant improvement on the prior art in that the designer has considerably more freedom in the selection of materials that can be used for the collector sheath of a practical self-powered detector or lead cable, having a given type of emitter/core-wire if the γ-ray response is to be controlled by varying the fraction of the collector sheath inner surface area that is covered with bands of a dissimilar metal.

As with using bands placed on the emitter core wire, the effect of bands on the inside of the collector sheath depends on the atomic number of the bands relative to those on the core wire itself, when bands are also placed thereon, and the atomic number of the core wire, and the fraction of the collector sheath inner surface that is covered.

Thus, for example, the magnitude of the negative γ-ray response of prompt-responding self-powered detectors and/or lead cables having emitters and/or core wires of nickel, iron, titanium, chromium, and alloys in which these metals are the major constituent, and a collector of Zircaloy or niobium, can be reduced substantially if, according to some embodiments of the present invention, metal bands of berylium, nickel, iron, titanium or chromium are placed on the inside of the collector.

It should be noted that the lead cable core wire need not be of the same material as that of the emitter core wire of the detector and the bands on the lead cable core wire need not be of the same material as that of the bands on the emitter core wire of the detector.

It should also be noted that the lead cable sheath need not be of the same material as that of the collector sheath of the detector, and the bands adjacent to and in electrical contact with the lead cable sheath need not be of the same material as the bands adjacent to and in electrical contact with the collector sheath of the detector.

Where an assembly of a self-powered neutron flux detector and lead cable therefor is concerned, any of the aforementioned bands may only be provided in the detector or in the lead cable therefor.

It is within the scope of the present invention to provide,
(i) a self-powered neutron flux detector having metal bands around the emitter core,
(ii) a self-powered neutron flux detector having metal bands adjacent to and in electrical contact with a self-powered neutron flux detector collector sheath,
(iii) a self-powered neutron flux detector having metal bands around the emitter core and metal bands adjacent to and in electrical contact with the collector sheath,
(iv) a lead cable for a self-powered neutron flux detector having metal bands around the core,
(v) a lead cable for a self-powered neutron flux detector having metal bands adjacent to and in electrical contact with lead cable sheath,
(vi) a lead cable for a self-powered neutron flux detector having metal bands around the core and metal bands adjacent to and in electrical contact with the lead cable sheath, and
(vii) the combination of any self-powered neutron flux detector designated (i) to (iii) with any lead cable for a self-powered neutron flux designated (iv) to (vi).

The present invention may also be used to manufacture a length of a multi-cored, mineral insulated cable, such as a twin-cored mineral insulated cable having predetermined γ-ray sensitivity in a high radiation environment.

I claim:

1. A method of manufacturing a length of mineral insulated cable having predetermined γ-ray sensitivity in a high radiation environment, comprising:
   (a) assembling an oversize outer metal sheath, a metal core wire along the bore of the metal sheath, metal bands at spaced intervals along, and extending around, the core wire, and frangible sleeves of an electrically insulating material in end-to-end relationship along and between the core wire and the metal sheath, the metal bands each having only one cylindrical surface adjacent to one cylindrical side of the frangible sleeves,
   (b) reducing the diameter of the metal sheath so that the frangible sleeves are crushed into discrete particles holding the core wire spaced from the metal sheath, in the form of a mineral insulated cable, and forming an electrically insulating layer around only the said one cylindrical surface of each band with the other cylindrical surface of each metal band in electrical contact with the metal sheath or the core wire, and
   (c) sealing the bore of the metal sheath.

2. A method according to claim 1 wherein at least a portion of the mineral insulated cable is a self-powered, neutron flux detector.

3. A method according to claim 1 wherein at least a portion of the mineral insulated cable is a self-powered, neutron flux detector lead cable.

4. A method according to claim 1 wherein metal bands are assembled directly on to, and spaced at intervals along, the core wire, and are reduced into electrical contact therewith and against dislodgement therealong before the frangible sleeves are assembled around the core wire.

5. A method according to claim 1 wherein metal bands are assembled on, insulated from, and at spaced intervals along, the core wire, and the metal sheath is reduced into electrical contact with them.

6. A method according to claim 1 wherein:
   (a) the core wire is of a material selected from the group consisting of nickel, iron, titanium, chromium, cobalt, and alloys based on at least one of these metals; and
   (b) the bands are of a material selected from the group consisting of platinum, palladium, tantalum, osmium, molybdenum, cerium, tin, ruthenium, niobium, zirconium, and alloys based on at least one of these metals.

7. A method according to claim 1 wherein the bands comprise in the range of five to ten bands of equal width and equally spaced longitudinally along the length of the core wire.

8. A method according to claim 1 wherein the bands overlie of the order of 40 to 60% of the core wire surface area.

9. A method according to claim 1 wherein the core wire is a nickel-base alloy nominally containing 76% nickel, 15.8% chromium, and 7.20% iron, and the bands are of platinum.

10. A method according to claim 9 wherein the detector is for use as a fuel power detector in a heavy-water-moderated, natural-uranium reactor, and wherein the core wire is a nickel-base alloy nominally containing 76% nickel, 15.8% chromium, 7.20% iron, by weight, the bands are of platinum, and the overall diameter of the core wire and the bands is less than of the order of 2 mm.

11. A method according to claim 1 wherein the core wire is of substantially pure nickel and the bands are platinum.

12. A method according to claim 1 wherein:
(a) the core wire is of a material selected from the group consisting of nickel, iron, titanium, chromium, cobalt, and alloys based on at least one of these metals; and
(b) the bands comprise at least two bands of different materials selected from the group consisting of platinum, palladium, tantalum, osmium, molybdenum, cerium, tin, ruthenium, niobium, zirconium, and alloys based on at least one of these metals.

13. A method according to claim 1 wherein the metal bands have a thickness in the range of the order of 0.02 mm to the order of 0.07 mm after the metal sheath has been reduced.

14. A method according to claim 1 wherein the material of the metal sheath is selected from the group consisting of zirconium, niobium, and alloys based on these materials, and the metal bands are adjacent to and in electrical contact with the metal sheath and are of at least one material selected from the group consisting of nickel, iron, titanium, chromium, aluminum, magnesium, beryllium, and alloys wherein at least one of these materials comprise the major constituent.

15. A method according to claim 1 wherein the sheath is of a material selected from the group consisting of nickel, iron, titanium, chromium, and alloys based on at least one of these materials, and the metal bands are adjacent to and are in electrical contact with and are of a material selected from the group comprising platinum, palladium, tantalum, osmium, molybdenum, cerium, tin, ruthenium, niobium, zirconium, and alloys based on at least one of these materials.

* * * * *